United States Patent
Duval

(10) Patent No.: US 12,010,217 B2
(45) Date of Patent: Jun. 11, 2024

(54) SECURE MEMORY SYSTEM PROGRAMMING FOR HOST DEVICE VERIFICATION

(71) Applicant: Micron Technology, Inc., Boise, ID (US)

(72) Inventor: Olivier Duval, Pacifica, CA (US)

(73) Assignee: Micron Technology, Inc., Boise, ID (US)

( * ) Notice: Subject to any disclaimer, the term of this patent is extended or adjusted under 35 U.S.C. 154(b) by 255 days.

(21) Appl. No.: 17/005,565

(22) Filed: Aug. 28, 2020

(65) Prior Publication Data

US 2022/0038266 A1 Feb. 3, 2022

Related U.S. Application Data

(60) Provisional application No. 63/059,617, filed on Jul. 31, 2020.

(51) Int. Cl.
*H04L 9/08* (2006.01)
*G06F 11/32* (2006.01)
(Continued)

(52) U.S. Cl.
CPC .......... *H04L 9/0825* (2013.01); *G06F 11/323* (2013.01); *G06Q 50/10* (2013.01);
(Continued)

(58) Field of Classification Search
CPC ..... H04L 9/0825; H04L 67/51; H04L 9/0866; G06F 11/323; G06Q 50/10
(Continued)

(56) References Cited

U.S. PATENT DOCUMENTS 6,456,729 B1 * 9/2002 Moore ............. G07B 17/00435
235/491
7,845,016 B2 * 11/2010 Diab ..................... H04L 9/3236
713/176
(Continued)

FOREIGN PATENT DOCUMENTS

KR 20150096435 8/2015
WO 2022026845 2/2022

OTHER PUBLICATIONS

Henry Livingston; Avoiding Counterfeit Electronic Components; IEEE:2007; pp. 187-189.*
(Continued)

*Primary Examiner* — Monjur Rahim
(74) *Attorney, Agent, or Firm* — Schwegman Lundberg & Woessner, P.A.

(57) ABSTRACT

Various examples are directed to a system for configuring a host device. The host device may comprise a memory system and may be programmed to receive subscriber software for interfacing the host device to a subscription service. The host device may also be programmed to receive from a first assembler secure appliance, first trace data based at least in part on the subscriber software and generate trace-derived data using the first trace data and the memory system identification key. The host device may also be programmed to send a subscription request to a subscription server associated with the subscription service. The subscription request may comprise the trace-derived data. The host device may also be programmed to receive, from the subscription server, subscription data for accessing the subscription service.

17 Claims, 9 Drawing Sheets

(51) Int. Cl.
- *G06F 21/64* (2013.01)
- *G06Q 50/10* (2012.01)
- *H04L 9/32* (2006.01)
- *H04L 67/306* (2022.01)
- *H04L 67/51* (2022.01)

(52) U.S. Cl.
CPC .......... *H04L 9/0866* (2013.01); *H04L 9/3247* (2013.01); *H04L 67/306* (2013.01); *H04L 67/51* (2022.05)

(58) Field of Classification Search
USPC .......................................................... 713/189
See application file for complete search history.

(56) References Cited

U.S. PATENT DOCUMENTS

| | | | | |
|---|---|---|---|---|
| 10,291,411 | B1* | 5/2019 | Durst | H04L 9/32 |
| 10,332,373 | B1* | 6/2019 | Dehmubed | G08B 13/2417 |
| 2002/0002688 | A1* | 1/2002 | Gregg | H04L 63/08 |
| | | | | 726/3 |
| 2011/0295908 | A1* | 12/2011 | To | G06F 21/31 |
| | | | | 709/217 |
| 2012/0130868 | A1 | 5/2012 | Loeken | |
| 2013/0145164 | A1 | 6/2013 | Nagai et al. | |
| 2014/0115323 | A1* | 4/2014 | Fanton | H04L 63/08 |
| | | | | 713/155 |
| 2014/0189890 | A1* | 7/2014 | Koeberl | G09C 1/00 |
| | | | | 726/34 |
| 2016/0072626 | A1* | 3/2016 | Kouladjie | H04L 9/0838 |
| | | | | 713/189 |
| 2017/0032153 | A1 | 2/2017 | Kuniavsky et al. | |
| 2017/0032381 | A1* | 2/2017 | Vaidyanathan | G06Q 30/0185 |
| 2018/0039795 | A1* | 2/2018 | Gulati | G06F 21/72 |
| 2018/0041341 | A1* | 2/2018 | Gulati | H04L 9/0877 |
| 2018/0097639 | A1* | 4/2018 | Gulati | G06F 21/57 |
| 2019/0356529 | A1* | 11/2019 | Gulati | H04L 9/3265 |
| 2020/0082089 | A1* | 3/2020 | Strong | G06F 21/575 |

OTHER PUBLICATIONS

"International Application Serial No. PCT US2021 043929, International Search Report dated Nov. 18, 2021", 3 pgs.

"International Application Serial No. PCT US2021 043929, Written Opinion dated Nov. 18, 2021", 4 pgs.

* cited by examiner

SECURE MEMORY SYSTEM PROGRAMMING FOR HOST DEVICE VERIFICATION

PRIORITY APPLICATION

This application claims the benefit of priority to U.S. Provisional Application Ser. No. 63/059,617, filed Jul. 31, 2020, which is incorporated herein by reference in its entirety.

BACKGROUND

Memory systems are typically provided as internal, semiconductor, integrated circuits in computers or other electronic devices. There are many different types of memory, including volatile and non-volatile memory.

Volatile memory requires power to maintain its data, and includes random-access memory (RAM), dynamic random-access memory (DRAM), or synchronous dynamic random-access memory (SDRAM), among others.

Non-volatile memory can retain stored data when not powered, and includes flash memory, read-only memory (ROM), electrically erasable programmable ROM (EEPROM), static RAM (SRAM), erasable programmable ROM (EPROM), resistance variable memory, such as phase-change random-access memory (PCRAM), resistive random-access memory (RRAM), magnetoresistive random-access memory (MRAM), or 3D XPoint™ memory, among others.

Flash memory is utilized as non-volatile memory for a wide range of electronic applications. Flash memory systems typically include one or more groups of one-transistor, floating gate or charge trap memory cells that allow for high memory densities, high reliability, and low power consumption.

Two common types of flash memory array architectures include NAND and NOR architectures, named after the logic form in which the basic memory cell configuration of each is arranged. The memory cells of the memory array are typically arranged in a matrix. In an example, the gates of each floating gate memory cell in a row of the array are coupled to an access line (e.g., a word line). In a NOR architecture, the drains of each memory cell in a column of the array are coupled to a data line (e.g., a bit line). In a NAND architecture, the drains of each memory cell in a string of the array are coupled together in series, source to drain, between a source line and a bit line.

Both NOR and NAND architecture semiconductor memory arrays are accessed through decoders that activate specific memory cells by selecting the word line coupled to their gates. In a NOR architecture semiconductor memory array, once activated, the selected memory cells place their data values on bit lines, causing different currents to flow depending on the state at which a particular cell is programmed. In a NAND architecture semiconductor memory array, a high bias voltage is applied to a drain-side select gate (SGD) line. Word lines coupled to the gates of the unselected memory cells of each group are driven at a specified pass voltage (e.g., Vpass) to operate the unselected memory cells of each group as pass transistors (e.g., to pass current in a manner that is unrestricted by their stored data values). Current then flows from the source line to the bit line through each series coupled group, restricted only by the selected memory cells of each group, placing current encoded data values of selected memory cells on the bit lines.

Each flash memory cell in a NOR or NAND architecture semiconductor memory array can be programmed individually or collectively to one or a number of programmed states. For example, a single-level cell (SLC) can represent one of two programmed states (e.g., 1 or 0), representing one bit of data. However, flash memory cells can also represent one of more than two programmed states, allowing the manufacture of higher density memories without increasing the number of memory cells, as each cell can represent more than one binary digit (e.g., more than one bit). Such cells can be referred to as multi-state memory cells, multi-digit cells, or multilevel cells (MLCs). In certain examples, MLC can refer to a memory cell that can store two bits of data per cell (e.g., one of four programmed states), a triple-level cell (TLC) can refer to a memory cell that can store three bits of data per cell (e.g., one of eight programmed states), and a quad-level cell (QLC) can store four bits of data per cell. MLC is used herein in its broader context, to can refer to any memory cell that can store more than one bit of data per cell (i.e., that can represent more than two programmed states).

Some memory arrays are two-dimensional (2D) structures arranged on a surface of a semiconductor substrate. To increase memory capacity for a given area, and to decrease cost, the size of the individual memory cells has decreased. However, there is a technological limit to the reduction in size of the individual memory cells, and thus, to the memory density of 2D memory arrays. In response, three-dimensional (3D) memory structures, such as 3D NAND architecture semiconductor memory systems, are being developed to further increase memory density and lower memory cost.

Memory arrays or systems can be combined together to form a storage volume of a memory system, such as a solid-state drive (SSD), a Universal Flash Storage (UFS™) device, a MultiMediaCard (MMC) solid-state storage device, an embedded MMC device (eMMC™), etc. An SSD can be used as, among other things, the main storage device of a computer, having advantages over traditional hard drives with moving parts with respect to, for example, performance, size, weight, ruggedness, operating temperature range, and power consumption. For example, SSDs can have reduced seek time, latency, or other delay associated with magnetic disk drives (e.g., electromechanical, etc.). SSDs use non-volatile memory cells, such as flash memory cells to obviate internal battery supply requirements, thus allowing the drive to be more versatile and compact.

An SSD can include a number of memory devices, including a number of dies or logical units (e.g., logical unit numbers or LUNs), and can include one or more processors or other controllers performing logic functions required to operate the memory devices or interface with external systems. Such SSDs may include one or more flash memory die, including a number of memory arrays and peripheral circuitry thereon. The flash memory arrays can include a number of blocks of memory cells organized into a number of physical pages. In many examples, the SSDs will also include DRAM or SRAM (or other forms of memory die or other memory structures). The SSD can receive commands from a host in association with memory operations, such as read or write operations to transfer data (e.g., user data and associated integrity data, such as error data and address data, etc.) between the memory devices and the host, or erase operations to erase data from the memory devices.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
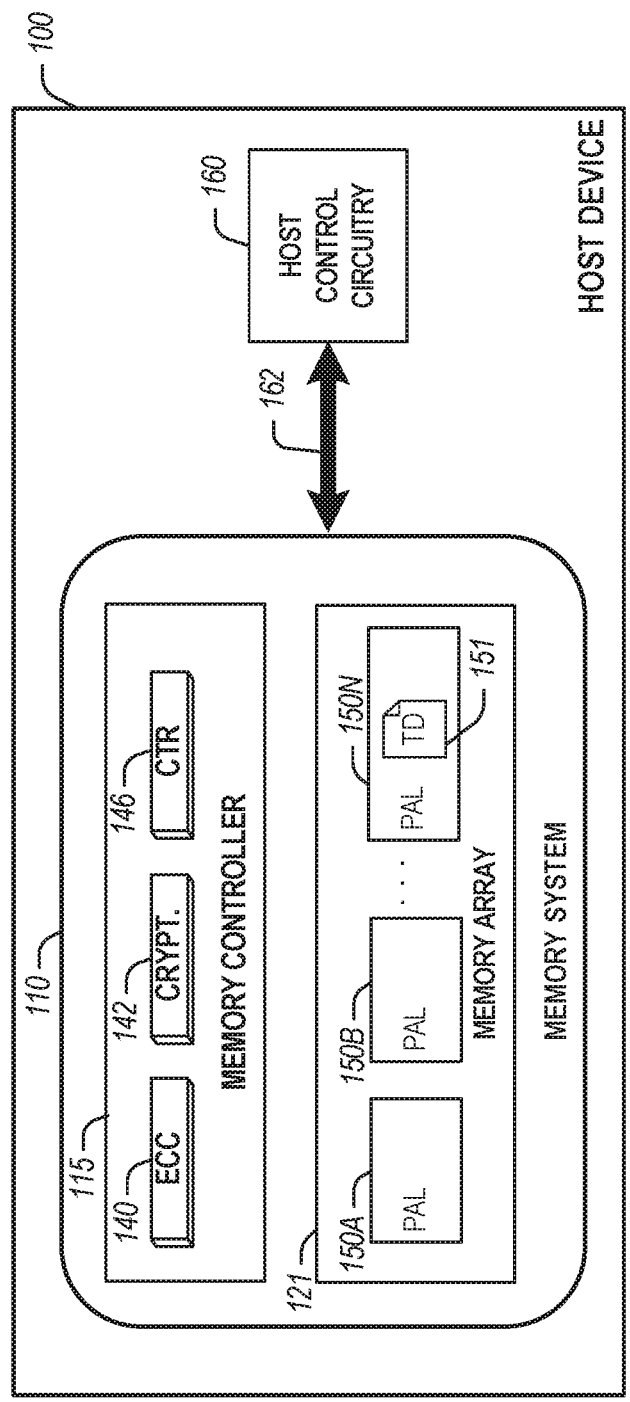
FIG. 1 illustrates an example of a host device including trace data stored at a memory system.

Aspects of the present disclosure are directed to secure memory system programming for host device verification. Memory systems, as described herein, can be incorporated into host devices, such as mobile telephones, tablet computing devices, Internet of Things (IoT) devices, etc. In the examples described herein, secure memory system is programming is used to verify a host device, for example, to detect and prevent the counterfeiting of host devices.

Counterfeiting is a recurring problem for manufacturers of host devices, such as mobile telephones and other types of host devices. Counterfeit host devices are falsely presented as being made be a given manufacturer. The counterfeit host device may be marked with the logo of a known manufacturer, such as Apple or Samsung, but may instead be made by a different party. Some counterfeit host devices include different hardware components than the corresponding authentic devices such as, for example, a less performant processor or a memory system including smaller or less reliable memory arrays. Other counterfeit devices, however, may include hardware that is very similar to authentic host devices and, in some cases, even assembled by the same subcontractors who assemble authentic host devices.

Counterfeit host devices cause problems for manufacturers and consumers. For example, a consumer who purchases a counterfeit host device may receive an inferior product that may also lack warranties, access to repair services, and other advantages of authentic host devices. Manufacturers may lose sales to counterfeit host devices and may also suffer brand damage. For example, a counterfeit host device may not have the same level of quality as an authentic host device. A consumer who purchases a counterfeit host device may associated the poor quality of the counterfeit device with the brand of the manufacturer.

Despite the problems of counterfeiting, it has proven difficult for manufacturers fight it. For example, a counterfeit host device sold on the black market will rarely come into contact with a manufacturer, if it does at all. Other parties who do come into contact with counterfeit host devices, such as subscriber services, may not have incentives to zealously search for counterfeit host devices. For example, a subscriber service, such as a mobile telephone or data network, may be paid by a subscriber using a counterfeit host device just as it is by a subscriber using an authentic host device.

These and other problems are addressed by the various examples described herein. For example, a memory system of a host device may be injected with unique and secret data, for example, at or about the time that the memory system is fabricated. The secret data stored at the memory system is also shared with a key management server. The key management server communicates with one or more assembler secure appliances that manage the assembly of a host device including the memory system. The assembler secure appliance uses the secret data received from the key management server to generated one or more instances of trace data that are stored at the memory system during assembly. The assembler secure appliance also provides trace verification data to the key management server.

When the host device is completed, it sends a subscription request to a subscription server. The subscription request is a request for the host device to participate in a subscription service, such as a mobile network or other suitable service. The subscription request includes trace-derived data that the host device and/or memory system generates using the trace data. The subscription server separately receives the trace verification data from the key management server. The subscription server uses the trace verification data to verify that the host device is in possession of the expected trace data received during assembly.

A counterfeit host device may not include trace data generated from the secret data associated with a host device memory system. Accordingly, the counterfeit host device may not be able to provide a subscription request that can be verified using the trace verification data. If the subscription request cannot be verified using the trace verification data, then the subscription server may deny the request of the host device.

FIG. 1 illustrates an example of a host device 100 including trace data 151 stored at a memory system 110. The host device 100 is in communication with one or more memory systems 110 via a communication interface 162. The host device 100 and/or the memory system 110 may be or be included in a variety of products, such as Internet of Things (IoT) devices (e.g., a refrigerator or other appliance, sensor, motor or actuator, mobile communication device, automobile, drone, etc.), network appliances (e.g., routers, switches, etc.), mobile telephones, or any other suitable products. In some examples, the host device 100 and memory system 110 are included in a common board or package.

In the example of FIG. 1, the host device 100 includes a host controller 160. The host controller 160 can include a processor, an application specific integrated circuit (ASIC), field programmable gate array (FPGA) or other suitable component or components that may, among other functions, manage the memory system 110. One or more communication interfaces 162 can be used to transfer data between the memory system 110 and one or more other components of the host device 100, such as the host controller 160. Examples of such communication interfaces include Serial Advanced Technology Attachment (SATA) interfaces, Peripheral Component Interconnect Express (PCIe) interfaces, Universal Serial Bus (USB) interfaces, Universal Flash Storage (UFS) interfaces, eMMC™ interfaces, or one or more other connectors or interfaces. The host device 100 can include a host system, an electronic device, a processor, a memory card reader, or one or more other electronic devices external to the memory system 110. Although one memory system 110 is shown as part of the host device 100, in other examples, additional memory systems can be included. In some examples, the host device 100 may be a machine having some portion, or all, of the components discussed with reference to the machine 900 of FIG. 9. Also, additional examples of host devices 100 are discussed with reference to FIG. 8.

The example of FIG. 1 shows various additional features of the memory system 110 including a memory controller 115 and a memory array 121. The memory array 121 includes a number of individual memory die (e.g., a stack of two-dimensional or three-dimensional (3D) NAND die, a stack of NOR die, etc.). In an example, the memory system 110 can be discrete memory or storage device components of the host device 100. In other examples, the memory system 110 can be a portion of an integrated circuit (e.g., system on a chip (SOC), etc.), stacked or otherwise included with one or more other components of the host device 100.

The memory controller 115 can receive instructions from the host device 100, and can communicate with the memory array 121, such as to transfer data to (e.g., write or erase) or from (e.g., read) one or more of the memory cells, planes, sub-blocks, blocks, or pages of the memory array 121. The memory controller 115 can include, among other things, circuitry or firmware, including one or more components or integrated circuits. For example, the memory controller 115 can include one or more memory control units, circuits, or components configured to control access across the memory array 121 and to provide a translation layer between the host device 100 and the memory system 110. The memory controller 115 can include one or more input/output (I/O) circuits, lines, or interfaces to transfer data to or from the memory array 121.

The memory controller 115 can include, among other things, circuitry or firmware, such as a number of components or integrated circuits associated with various memory management functions. Management functions for NAND storage units can include wear leveling (e.g., garbage collection or reclamation), error detection or correction, block retirement, or one or more other memory management functions.

The memory controller 115 may parse or format commands received from the host 105 into host commands (e.g., commands received from a host) into device commands (e.g., commands associated with operation of a memory array, etc.), or generate device commands (e.g., to accomplish various memory management functions) for the memory controller 115 or one or more other components of the memory system 110.

For example, when the host controller 160 receives a command message from another device, such as the key management server and/or assembler secure appliance, as described herein, the host controller 160 sends the command message to the memory controller 115 of the memory system 110. The memory controller 115 can verify a cryptographic signature included with the command message, for example, using a memory system root key. If the cryptographic signature is verified, the memory controller 115 causes the memory system 110 execute the command. For unsigned commands, the memory controller 115 can execute the command without first verifying a cryptographic signature.

In some examples, the memory system 110 includes measured and non-measured portions of the memory array 121. Measured portions include one or more physical address locations 150A, 150B, 150N that are secured, for example, using the memory system root key. For example, commands to read from or write to the measured portions of the memory array 121 may be signed commands that are not executed by the memory controller 115 unless accompanied by a verified cryptographic signature. Unmeasured portions of the memory array 121 include one or more physical address locations 150A, 150B, 150N that are accessed with unsigned commands. For example, a request to read from or write to the non-measured portions of the memory command may be executed without a verified cryptographic signature.

The memory controller 115 can manage a set of management tables configured to maintain various information associated with one or more components of the memory system 110 (e.g., various information associated with a memory array or one or more memory cells coupled to the memory controller 115). For example, for a NAND memory system, the management tables can include information regarding block age, block erase count, error history, or one or more error counts (e.g., a write operation error count, a read bit error count, a read operation error count, an erase error count, etc.) for one or more blocks of memory cells coupled to the memory controller 115. In certain examples, if the number of detected errors for one or more of the error counts is above a threshold, the bit error can be referred to as an uncorrectable bit error. The memory controller 115 can maintain at the management tables a count of correctable or uncorrectable bit errors, among other things.

Management tables can also include one or more logical-to-physical (L2P) tables including L2P pointers relating logical addresses to physical addresses at the memory array 121. The management tables may be stored at a RAM of the memory controller 115. In some examples, some or all of the management tables are stored at the memory array 121. For example, the memory controller 115 may read the management tables from the memory array 121 and/or cache some or all of the management tables at RAM of the memory controller 115.

The memory controller 115 can also include, among other things, circuitry or components configured to control memory operations associated with writing data to, reading data from, or erasing one or more memory cells of the memory system 110 coupled to the memory controller 115. The memory operations can be based on, for example, host commands received from the host device 100 (e.g., the host controller 160 thereof), or internally generated by the memory controller 115 (e.g., in association with wear leveling, error detection or correction, etc.).

The memory controller 115 can include an error correction code (ECC) component 140, which can include, among other things, an ECC engine or other circuitry configured to detect or correct errors associated with writing data to or reading data from one or more memory cells of the memory system 110 coupled to the memory controller 115. The memory controller 115 can be configured to actively detect and recover from error occurrences (e.g., bit errors, operation errors, etc.) associated with various operations or storage of data, while maintaining integrity of the data transferred between the host device 100 and the memory system 110, or maintaining integrity of stored data (e.g., using redundant RAID storage, etc.), and can remove (e.g., retire) failing memory resources (e.g., memory cells, memory arrays, pages, blocks, etc.) to prevent future errors.

In the example of FIG. 1, the memory controller 115 also includes a cryptographic engine 142. The cryptographic engine 142 can be configured to execute cryptographic operations on data, for example, as described herein. The cryptographic engine 142 may include one or more key registers and one or more calculation engines. Key registers can store cryptographic keys used to execute cryptographic operations. For example, a key register can store the memory system root key for evaluating signed commands (e.g., a public key of the signing device and/or a symmetric key also known to the signing device). Although key registers are described as components of the cryptographic engine 142, in some examples, key registers may be positioned elsewhere, for example, a secured location at the memory array 121. The math engine can be configured to perform cryptographic operations, for example, utilizing one or more cryptographic keys stored at a key register. Cryptographic keys include values that are used, for example, by the cryptographic engine 142, to perform cryptographic operations.

The cryptographic engine 142 can be configured to execute one or more cryptographic operations to generate cryptographic signatures as described herein. The cryptographic engine 142 can be configured to generate cryptographic signatures using any suitable cryptographic algorithm such as, for example, a cryptographic hash function such as an SHA algorithm (e.g., SHA256), the MD5 algorithm, elliptic curve digital signature algorithm (ECDSA), hash-based message authentication code (HMAC), etc. A cryptographic hash function maps an input value to a, usually shorter, hash value. The hash function can be selected such that it is unlikely that two different input values will map to the same hash value. The cryptographic engine 142 can be configured to generate a cryptographic signature by executing an HMAC or ECDSA function on an input value related to the content being digitally signed.

In some examples, the cryptographic engine 142 is configured to operate in conjunction with a communication interface between the host device 100 and the memory system 110. For example, the cryptographic engine 142 may comprise a key register or other suitable storage location for storying a cryptographic key that is used for encrypting and/or generating cryptographic signatures related to communications between the memory system 110 and host device 100, for example, according to the PCIe or other suitable interface.

In some examples, the memory controller 115 also comprises a memory device counter 146. The memory device counter 146 includes software or hardware for incrementing counter values. The memory device counter 146 can be a monotonic counter that is configured such that the counter values always move in a particular direction along a counter sequence. For example, the memory device counter 146 begins at a known initial value (e.g., when the memory system 110 is manufactured). When an incrementing event occurs, the monotonic counter 146 increments from the known initial value to a next value along the counter sequence in the counter sequence direction. When a subsequent incrementing event occurs, the monotonic counter 146 increments to the next value along the counter sequence, and so on. The counter sequence can include, for example, a set of rising integers, a set of declining integers, a set of prime integers, a set of even integers, or any other suitable sequence. As used herein, a first counter value is said to be larger than a second counter value if the first counter value is encountered along the counter sequence after incrementing the counter one or more times from the second counter value along the counter sequence direction.

Incrementing events can include any suitable event at the memory system 110. For example, an incrementing event can occur when the memory system 110 executes a signed command. Another example incrementing event can occur when the memory system 110 receives an instruction to increment the monotonic counter 146. Another example incrementing event can occur when the memory system 110 is reset or restarted.

The memory array 121 can include several memory cells arranged in, for example, one or more devices, one or more planes, one or more sub-blocks, one or more blocks, one or more pages, etc. As one example, a 48 GB TLC NAND memory device can include 18,592 bytes (B) of data per page (16,384+2208 bytes), 1536 pages per block, 548 blocks per plane, and 4 or more planes per device. As another example, a 32 GB MLC memory device (storing two bits of data per cell (i.e., 4 programmable states)) can include 18,592 bytes (B) of data per page (16,384+2208 bytes), 1024 pages per block, 548 blocks per plane, and 4 planes per device, but with half the required write time and twice the program/erase (P/E) cycles as a corresponding TLC memory device. Other examples can include other numbers or arrangements. In some examples, a memory device, or a portion thereof, may be selectively operated in SLC mode, or in a desired MLC mode (such as TLC, QLC, etc.).

The memory array 121 includes physical address locations 150A, 150B, 150N. A physical address location 150A, 150B, 150N is a location at the memory array 121 that is uniquely associated with a physical address. In operation, data is typically written to or read from a NAND memory array 121 in pages and erased in blocks. For example, a physical address location 150A, 150B, 150N may correspond to a page. However, some memory operations (e.g., read, write, erase, etc.) can be performed on larger or smaller groups of memory cells, as desired. Accordingly, in some examples (e.g., for some operations) a physical address location 150A, 150B, 150N includes more or less than one page. The data transfer size of the memory system 110 is typically referred to as a page, whereas the data transfer size of a host device 100 is typically referred to as a sector.

Although a page of data can include a number of bytes of user data (e.g., a data payload including a number of sectors of data) and its corresponding metadata, the size of the page often refers only to the number of bytes used to store the user data. As an example, a page of data having a page size of 4 KB may include 4 KB of user data (e.g., 8 sectors assuming a sector size of 512 B) as well as a number of bytes (e.g., 32 B, 54 B, 224 B, etc.) of metadata corresponding to the user data, such as integrity data (e.g., error detecting or correcting code data), address data (e.g., logical address data, etc.), or other metadata associated with the user data. Physical address locations 150A, 150B, 150N with storage for metadata, etc. may be referred to as over-provisioned physical address locations.

Different types of memory cells or memory arrays 121 can provide for different page sizes or may require different amounts of metadata associated therewith. For example, different memory device types may have different bit error rates, which can lead to different amounts of metadata necessary to ensure integrity of the page of data (e.g., a memory device with a higher bit error rate may require more bytes of error correction code data than a memory device with a lower bit error rate). As an example, a multilevel cell (MLC) NAND flash device may have a higher bit error rate than a corresponding single-level cell (SLC) NAND flash device. As such, the MLC device may require more metadata bytes for error data than the corresponding SLC device.

In the example of FIG. 1, trace data 151 is included at a physical address location 150N of the memory system 110. The trace data 151 can be provided and used as described herein to authenticate the host device 100 to a subscriber server.

Figure 2:
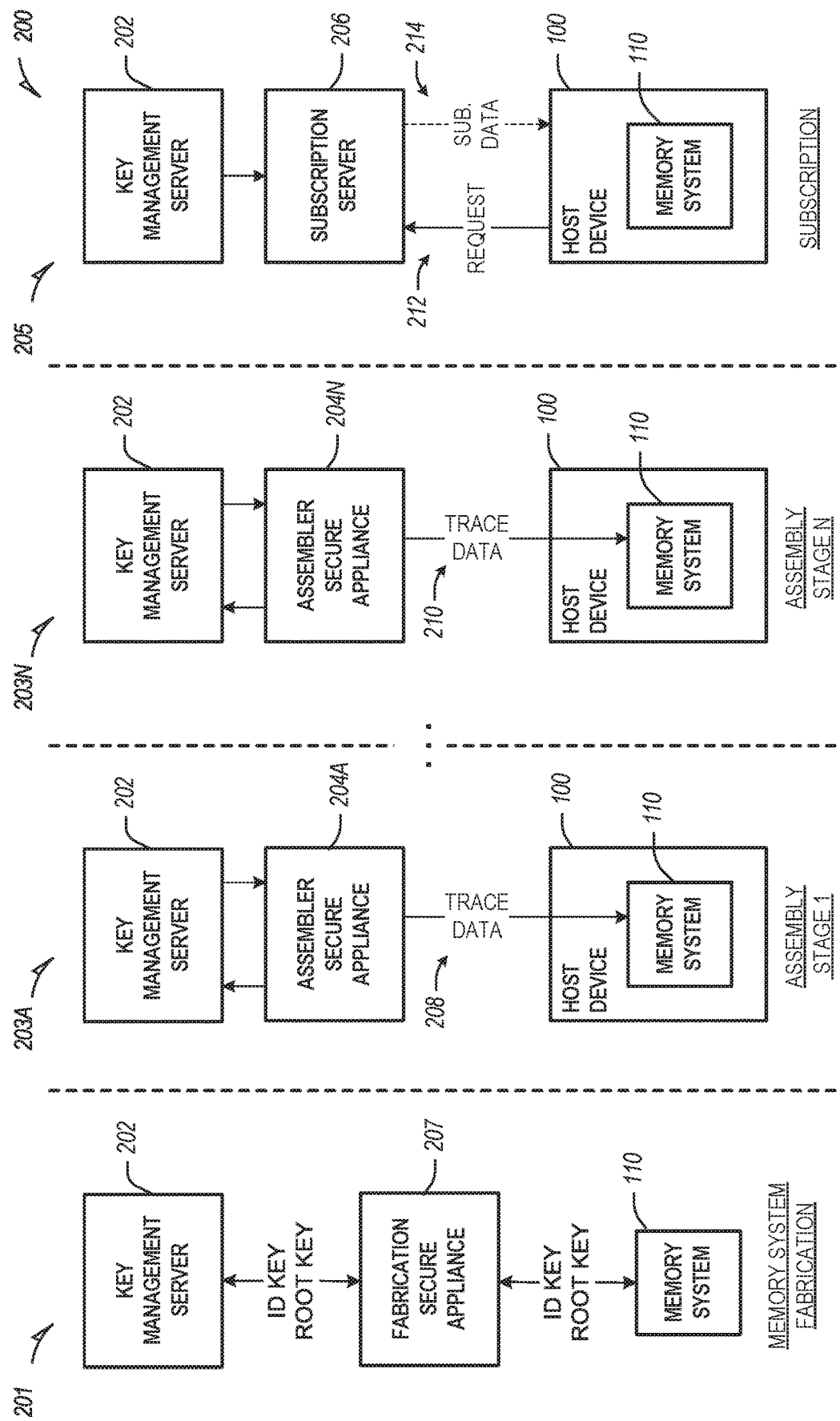
FIG. 2 is a workflow showing one example of a process for configuring the host device with trace data.

FIG. 2 is a workflow showing one example of a process 200 for configuring the host device 100 with trace data 151, as described herein. The process 200 involves the host device 100, a key management server 202, assembler secure appliances 204A, 204N, and a subscription sever 206. In some examples, the process 200 also involves a fabrication secure appliance 207 as described herein.

The key management server 202 is configured to securely communicate with the memory system 110 (e.g., via the fabrication secure appliance 207), the assembler secure appliances 204A, 204N, and the subscription server 206. The key management server 202 may store various data including, for example, device keys for various memory systems including the memory system 110, assembler public keys, various data about traces stored at the memory system 110 and host device 100, and other similar data.

The assembler secure appliances 204A, 204N may be or include any suitable secure appliance used in the assembly of the host device 100. In some examples, the assembler secure appliances 204A, 204N may be or include a hardware secure module (HSM) that is configured to securely configure the host device 100 and the memory system 110. Although two assembler secure appliances 204A, 204N are shown in FIG. 2, in some examples, different numbers of assembler secure appliances 204A, 204N may be used. For example, different assembly stages 203A, 203N may be performed at different assembly facilities at different locations. In some examples, each assembly facility may have an assembler secure appliance 204A, 204N. Also, in some examples, a single assembler secure appliance 204A, 204N can be used to provide more than one instance of trace data to the host device 100. Further, in examples where more than two instances of trace data are provided to the host device 100, additional assembler secure appliances (not shown) may be used.

The fabrication secure appliance 207 may also be or include an HSM. The fabrication secure appliance may be configured to secure configure the memory system 110, for example, during fabrication of the memory system 110. In some examples, the fabrication secure appliance 207 acts as an interface between the key management server 202 and the memory system 110 as shown.

The subscription server 206 is associated with a subscription service. The subscription service may provide, for example, a telephone and/or data network that provides connectivity to the host device 100. The subscription server 206 may be or include any suitable device programmed to provide the host device 100 with access to the subscription service.

The process flow 200 includes a memory system fabrication stage 201, assembly stages 203A, 203N, and a subscription stage 205. The memory system 110 is fabricated at the memory system fabrication stage 201. During or after the fabrication process, the memory system 110 communicates with the key management server 202 to exchange secret data. In some examples, the memory system 110 communicates with the key management server 202 via the fabrication secure appliance 207, as shown in FIG. 1. Also, in some examples, the fabrication secure appliance 207 may perform various operations for generating and/or formatting the secret data exchanged between the key management server 202 and the memory system 110, for example, as described herein with respect to FIG. 4.

In some examples, the secret data exchanged between the key management server 202 and the memory system 110 can include one or more of a memory system identification (ID) key and/or a root key. The memory system ID key is a cryptographic key that is unique to the memory system 110. For this reason, the ID key can be used to uniquely identify the memory system 110. Accordingly, in some examples, the memory system ID key for the memory system 110 is used to generate and/or verify the trace data as described herein. The root key is a cryptographic key that may also be unique to the memory system 110 and may be used by the memory system 110 to verify signed commands. For example, when the memory system 110 receives a command to read or write data from a measured portion of the memory array 121, the memory system 110 may check to verify whether the command is digitally signed using the root key. If the command cannot be verified, the memory system 110 may not execute the command.

In some examples, the memory system 110 is configured to generate a public/private system ID key pair derived from a physical unclonable function (PUF) at the memory device. The PUF may utilize unique physical properties of the memory array 121 or other component of the memory to generate data unique to the memory system 110. The key management server 202 may hold a server root public/private key pair. During or after the fabrication process, the memory system 110 communicates with the key management server 202 to exchange public keys, for example, via the fabrication secure appliance 207.

Figure 4:
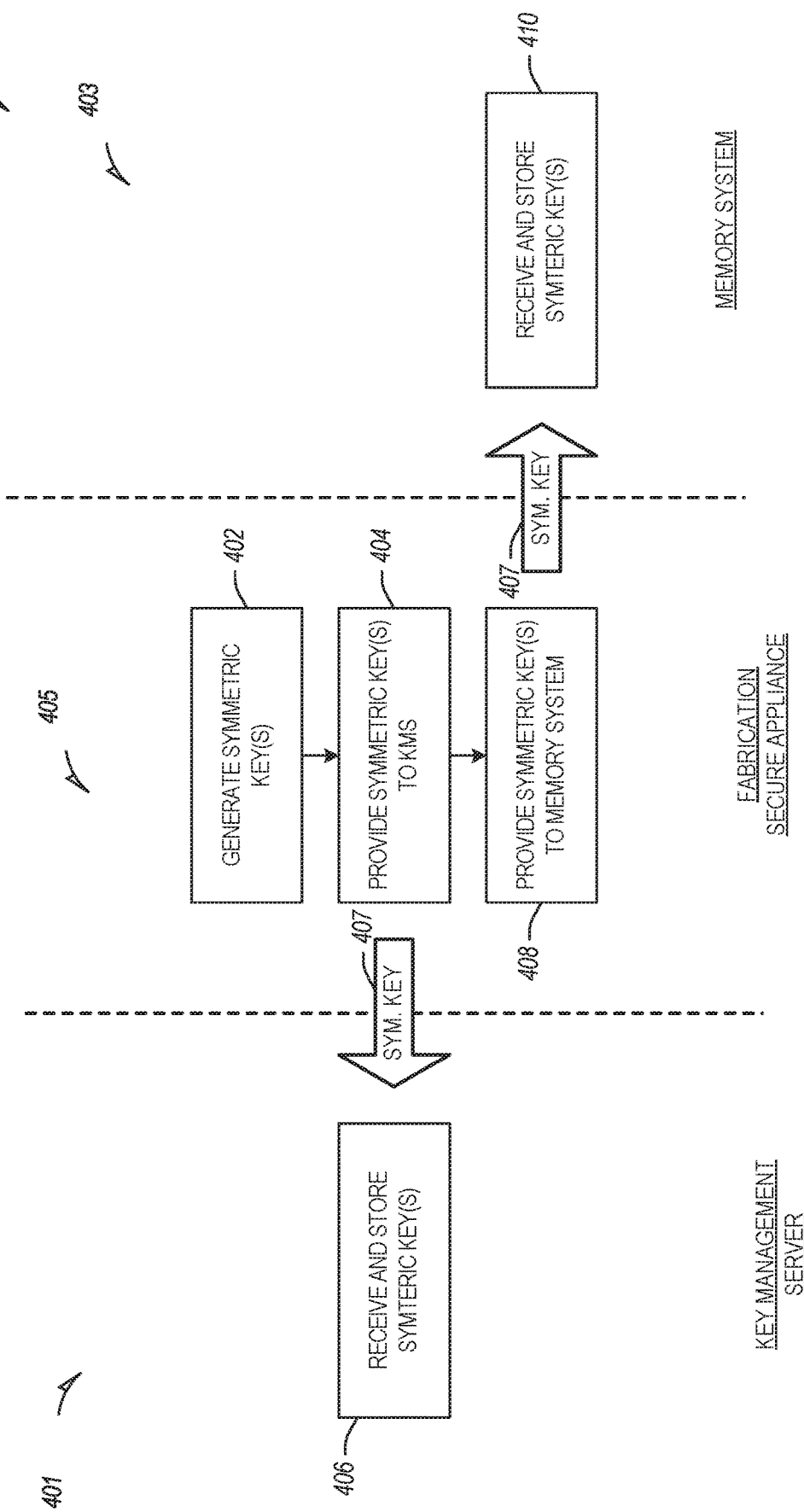
FIG. 4 is a flowchart showing one example of a process flow that may be executed by the key management server and the memory system to generate secret data and inject the secret data to the memory system using a symmetric scheme.
Figure 5:
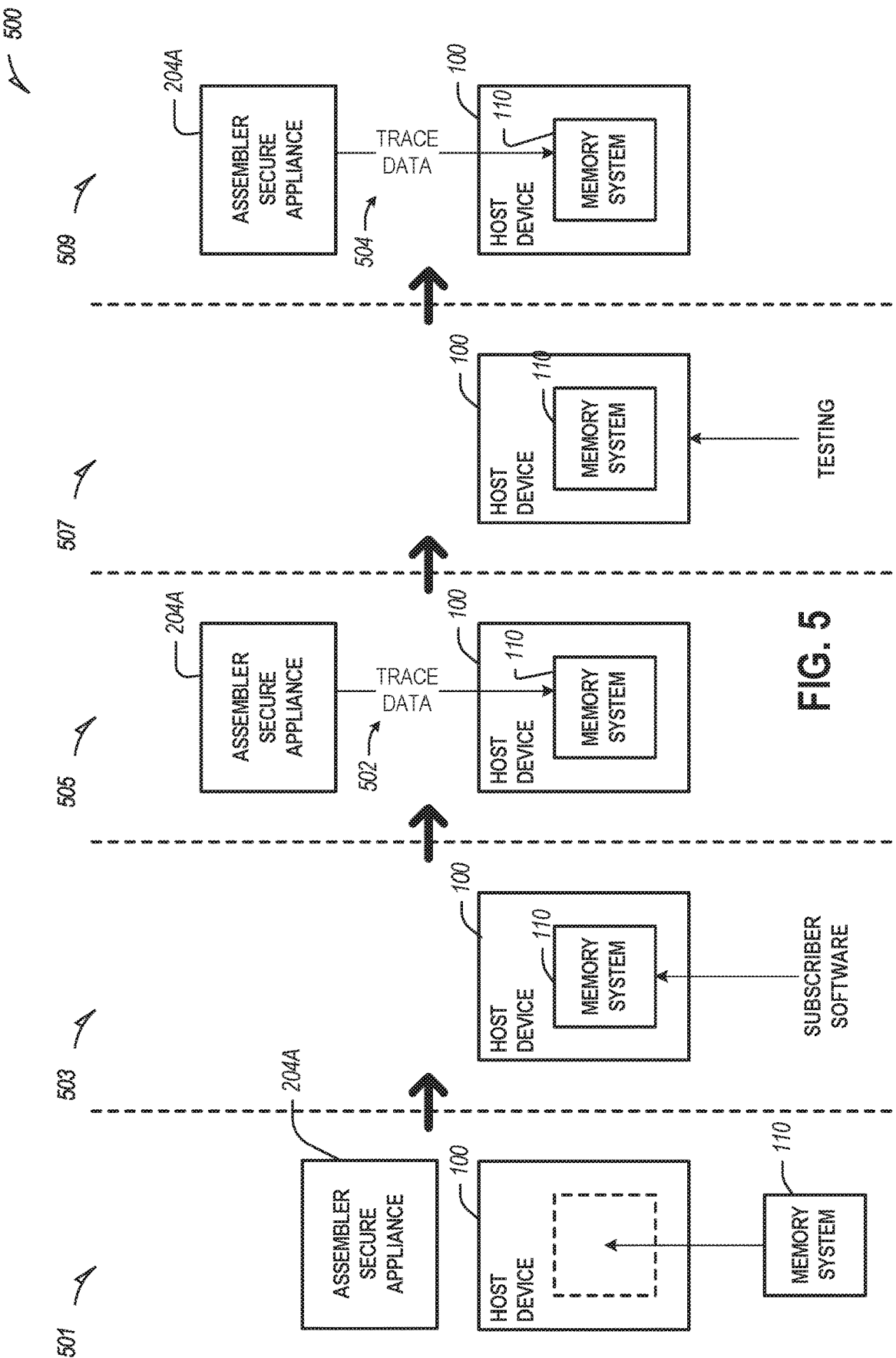
FIG. 5 is a workflow showing one example of a process for executing an assembly stage of a host device.

At the conclusion of the memory system fabrication stage 201, the memory system ID key and/or the root key is stored at the memory system 110 and at the key management server. For example, the memory system ID key and/or root key may be stored at a key register of the cryptographic engine 142. FIGS. 4 and 5 herein describe example techniques for generating cryptographic keys, such as the ID key and the root key, and injecting the keys to the memory system 110 and key management server 202.

The assembly stage 203A may be managed by the assembler secure appliance 204A. The assembler secure appliance 204A contacts the key management server 202 and exchanges information therewith. For example, the key management server 202 may provide the assembler secure appliance 204A with some or all of the secret data shared with the memory system 110 at the memory system fabrication stage. For example, the key management server 202 may provide the assembler secure appliance 204A with the root key for the memory system 110 and/or the ID key for the memory system 110.

The assembly stage 203A may include installing the memory system 110 at the host device 100 as shown. The assembly stage 203A may also include, for example, loading subscriber software to the memory system 110. The subscriber software may be executed by the host device 100 at a later time to access and utilize the subscription service initiated by the subscription server. In some examples, the subscriber software is loaded to a measured portion of the array 121 of the memory system 110. For example, the assembler secure appliance 204A may provide a signed command instructing the host device 100 to write the subscriber software to the measured portion of the memory system 120. The signed command may be signed with a cryptographic operation utilizing the root key of the memory system 110. The memory system 110 (e.g., the cryptographic engine 142 of the memory controller 115) may verify the signed command and execute the command by storing the subscriber software at a measured portion of the memory array 121.

The assembly stage 203A may also include providing trace data 208 to the host device 100 (e.g., the memory system 110 thereof). The trace data 208 can be generated and/or provided to the memory system 110 using the secret data shared between the memory system 110 and the key management server 202 at the memory system fabrication stage 201.

In some examples, the trace data 208 is or includes host configuration data describing the host device 100. The host configuration data can include, for example, a hash of the subscriber software installed at the host device 100, a hash of other software installed at the host device 100, a result of a test performed on the host device 100 (e.g., a quality assurance test), a hash of the result of a test performed on the host data 100, or any other suitable host configuration data describing the host device 100.

In some examples, the trace data 208 is based on a hash of host configuration data, such as a hash the subscriber software installed at the host device 100. The hash may be the result of applying a cryptographic hash function to the host configuration data. For example, to generate a hash of the subscriber software, a cryptographic hash function may be applied to the subscriber software itself (e.g., object code and/or binary code thereof).

In examples where a hash is generated from the host configuration data, the assembler secure appliance 204A may instruct the memory system 110 to generate the hash. In some examples, the assembler secure appliance 204A instructs the memory system 110 to generate a signature using the memory system ID key of the memory system 110. For example, the assembler secure appliance 204A may utilize the root key for the memory system 110 to send a signed instruction to write the trace data 208 to a measured portion of the memory system 120.

In some examples, the assembler secure appliance 204A generates a cryptographic signature based on the host configuration data (e.g., subscriber software hash, test result, etc.). The cryptographic signature is generated using the host configuration data and a private key of the assembler secure appliance 204A. In some examples, the assembler secure appliance 204A generates a cryptographic signature that includes an X.509 certificate based on the host configuration data and using its private key. The assembler secure appliance 204A provides the trace data 208 including the cryptographic signature and, in some examples, the host configuration data to the host device 100 for storage at the memory system. In some examples where the trace data 208 is or includes a cryptographic signature of the assembler secure appliance 204A, the host device 100 may store the trace data 208 at an un-measured or unsecure portion of the memory system 110.

At the assembly stage 203A, the assembler secure appliance 204A also provides the key management server 202 with trace verification data that can be used to verify the trace data 208. The trace verification data can include, for example, trace configuration data describing how the trace data 208 is configured. For example, trace configuration data may describe, for example, whether the trace data 208 includes a cryptographic signature of the assembler secure appliance 204A, whether the trace data 208 includes a hash of subscriber software or other configuration data, etc. The trace verification data, in some examples, also includes the host configuration data and/or a hash of the host configuration data. In examples where the trace data 208 includes a cryptographic signature of the assembler secure appliance 204A, the trace verification data provided to the key management server 202 may also include a public key of the assembler secure appliance 204A. The public key of the assembler secure appliance 204A may be used, as described herein, to verify the cryptographic signature of the assembler secure appliance 204A generated with the private key of the assembler secure appliance 204A.

The assembly stage 203N may be similar to the assembly stage 203A. For example, the assembler secure appliance 204N may receive from the key management server 202 some or all of the secret data injected to the memory system 110 at the memory system fabrication stage 201 and may provide the key management server with trace verification data, as described herein. The assembler secure appliance 204N monitors one or more assembly steps for the host device 100 such as, for example, the installation of a hardware component, the installation of software, the performance of a quality assurance test, etc. Upon completion of the assembly step, the assembler secure appliance 204N generates and stores trace data 210 at the host device, for example, as described herein.

At the subscription stage 205, manufacturing of the host device 100 may be complete. The host device 100 makes a subscription request 212 directed towards the subscription server 206. The subscription request 212 includes trace-derived data that is derived from trace data 208, 210 stored at the host device. The trace-derived data can include some or all of the trace data 208, 210 itself. For example, when an assembler secure appliance 204A, 204N has provided its cryptographic signature with the trace data 208, 210, the trace-derived data can include the cryptographic signature. In some examples, the trace-derived data includes a hash of the trace data 208 generated by the host device 100. In some examples, the trace-derived data can include a digital certificate generated by the host device 100 and/or memory system 110 using the trace data 208, 210. The digital certificate may include a cryptographic signature of the trace data 208, 210 generated, for example, using a private key of the host device 100 and/or memory system 110.

The subscriber server 206 may also be in communication with the key management server 202 to receive trace verification data. The trace verification data can include, for example, one or more digital certificates generated using the trace data 208, 210 and/or host configuration data provided by the assembler secure appliances 204A, 204N. In some examples, the trace verification data includes the public key of one or more of the assembler secure appliances 204A, 204N.

The subscriber server 206 uses the trace verification data to verify the trace-derived data provided by the host device 100 at the subscription request 212. If the trace-derived data is verified, then the subscriber server 206 may grant the subscription request 212. For example, the subscriber server 206 may provide subscription data 214 to the host device 100, where the host device 100 users the subscription data 214 to access the subscription service associated with the subscription server 206.

Figure 3:
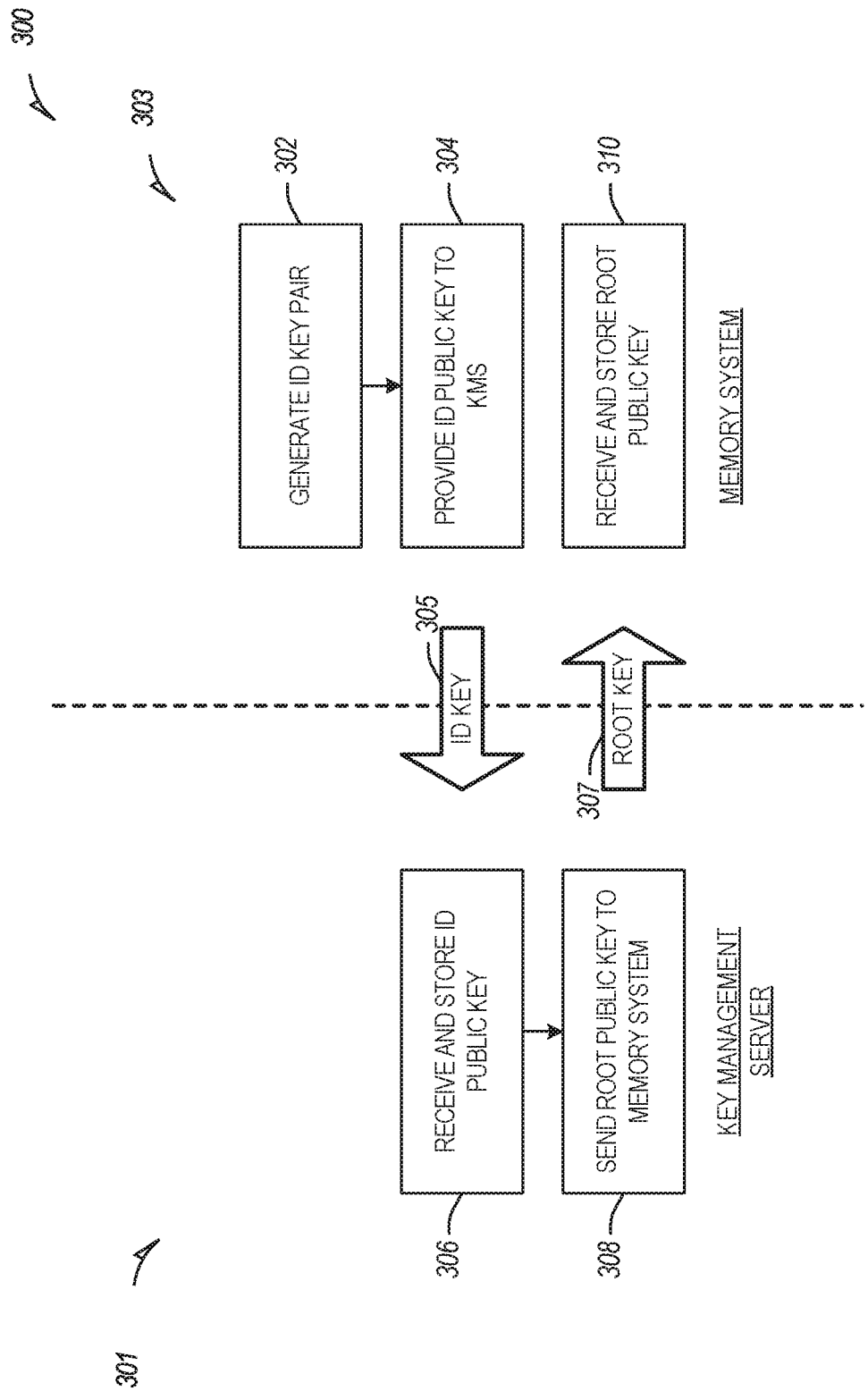
FIG. 3 is a flowchart showing one example of a process flow that may be executed by the key management server and the memory system to generate secret data and inject the secret data to the memory system using an asymmetric scheme.

FIG. 3 is a flowchart showing one example of a process flow 300 that may be executed by the key management server 202 and the memory system 110 to generate secret data and inject the secret data to the memory system 110. For example, FIG. 3 shows one example way that the fabrication stage 201 could be implemented. In the example of FIG. 3, the secret data includes a memory system ID key and/or a root key and the keys are generated according to an asymmetric scheme. The flowchart of FIG. 3 includes two columns 301, 303. The column 301 includes operations performed by the key management server 202. The column 303 includes actions performed by the memory system 110.

At operation 302, the memory system 110 generates a memory system ID key pair. The memory system ID key pair includes a private key and a public key. The key pair may be generated in any suitable manner. For example, the memory system 110 may determine a value of a PUF generated from all or a portion of the memory array 121 and use the PUF to generate the memory system ID key pair. In some examples, the memory system ID private key is stored at the memory system 110, such as at a key register. In other examples, the memory system ID private key is not stored at the memory system 110. For example, when the memory system ID private key is generated utilizing a PUF, the memory system 110 may generate the memory system ID private key using the PUF, for example, at boot time.

At operation 304, the memory system 110 sends the memory system ID public key 305 to the key management server 202. The key 305 may be provided directly to the key management server 202 or may be provided indirectly, via a secure appliance (not shown). The key management server 202 receives the memory system ID public key 305 at operation 306 and stores the key 305 at a secure location. At operation 308, the key management server 202 sends a root public key 307 to the memory system 110. The memory system 110 receives and stores the root public key at operation 310. For example, the root public key may be stored at a key register of the memory system 110, for example, as described herein. The root public key is associated with a root private key that is securely stored at the key management server 202. The key management system 202 may generate the root key pair including the root public key and the root private key. The key management server 202 may provide the root public key to the assembler secure appliances 204A, 204N for creating signed commands to the memory system 110.

FIG. 4 is a flowchart showing one example of a process flow 300 that may be executed by the key management server 202 and the memory system 110 to generate secret data and inject the secret data to the memory system 110 using a symmetric scheme. Like the process flow 300, the process flow 400 includes three columns 401, 403, 405. The column 401 includes actions performed by the key management server 202. The column 405 includes actions performed by the fabrication secure appliance 203. The column 403 includes actions performed by the memory system 110.

At operation 402, the fabrication secure appliance 203 generates one or more symmetric keys. For example, the fabrication secure appliance 203 may generate a memory system ID key and/or a root key. The keys may be generated utilizing a random number generator, or by any other suitable technique. At operation 404, the fabrication secure appliance 203 provides the one or more symmetric keys 405 to the key management server 202. The key management server 202 receives the one or more keys at operation 406 and stores the keys, for example, to be provided to one or more assembler secure appliances 204A, 204N as described herein. At operation 408, the fabrication secure appliance 203 provides the one or more symmetric keys 405 to the memory system 110. The memory system 110 receives the one or more keys at operation 410. The memory system 110 may store the keys locally, for example, at a key register as described herein.

FIG. 5 is a workflow showing one example of a process 500 for executing an assembly stage, such as the assembly stages 203A, 203N of FIG. 2. In the example of FIG. 5, a single assembler secure appliance 204A provides trace data 502 and 504 to the host device 100 and ultimately to the memory system 110. Prior to the process 500, the secret data, such as the memory system ID key and root key, are generated and shared between the memory device 110 and the key management server 202. The key management server 202 may provide the secret data to the assembler secure appliance 204A, for example, as described herein.

At stage 501, the memory system 110 is installed to the host device 100. At stage 503, subscriber software is installed to the host device 100. In some examples, as described herein, the subscriber software is installed to a measured portion of the memory system 110. For example, the assembler secure appliance 204A may send the host device 100 a signed command to install the subscriber software to the measured of the memory system.

At stage 505, the assembler secure appliance 204A generates trace data 502 using the subscriber software, or a hash thereof, as the host configuration data. The assembler secure appliance 204A provides the trace data 502 to the memory system 110 (e.g., via the host device 100). In some examples, the trace data 502 includes a hash of the subscriber software. For example, the hash of the subscriber software may be provided with a signed command requesting that the hash be stored at a measured portion of the memory system 110. In some examples, the trace data 502 also includes a digital certificate for the hash of the subscriber software. The digital certificate can include a cryptographic signature generated using the hash of the subscriber software and the private key of the assembler secure appliance 204A. In some examples, the digital certificate is stored at a non-measured portion of the memory system 110.

At stage 507, the host device 100 is subjected to a test, such as a quality assurance test. The test may gauge any suitable aspect of the host device 100 including, read or write speed from the memory device 110, a number of accessible physical access locations 150A, 150B, 150N at the memory device 110, etc. The test may produce a test result. The test result may be used as host configuration data for the trace data 504 provided to the host device 100 and memory system 110 at stage 509. For example, the assembler secure appliance 204A may generate a hash of the test result and provide the test result to the host device 100 with a signed command to store the test result at a measured portion of the memory system 110. In other examples, the assembler secure appliance 204A generates a digital certificate that includes a cryptographic signature of the test result. The trace data 504 may include the generated digital certificate.

Figure 6:
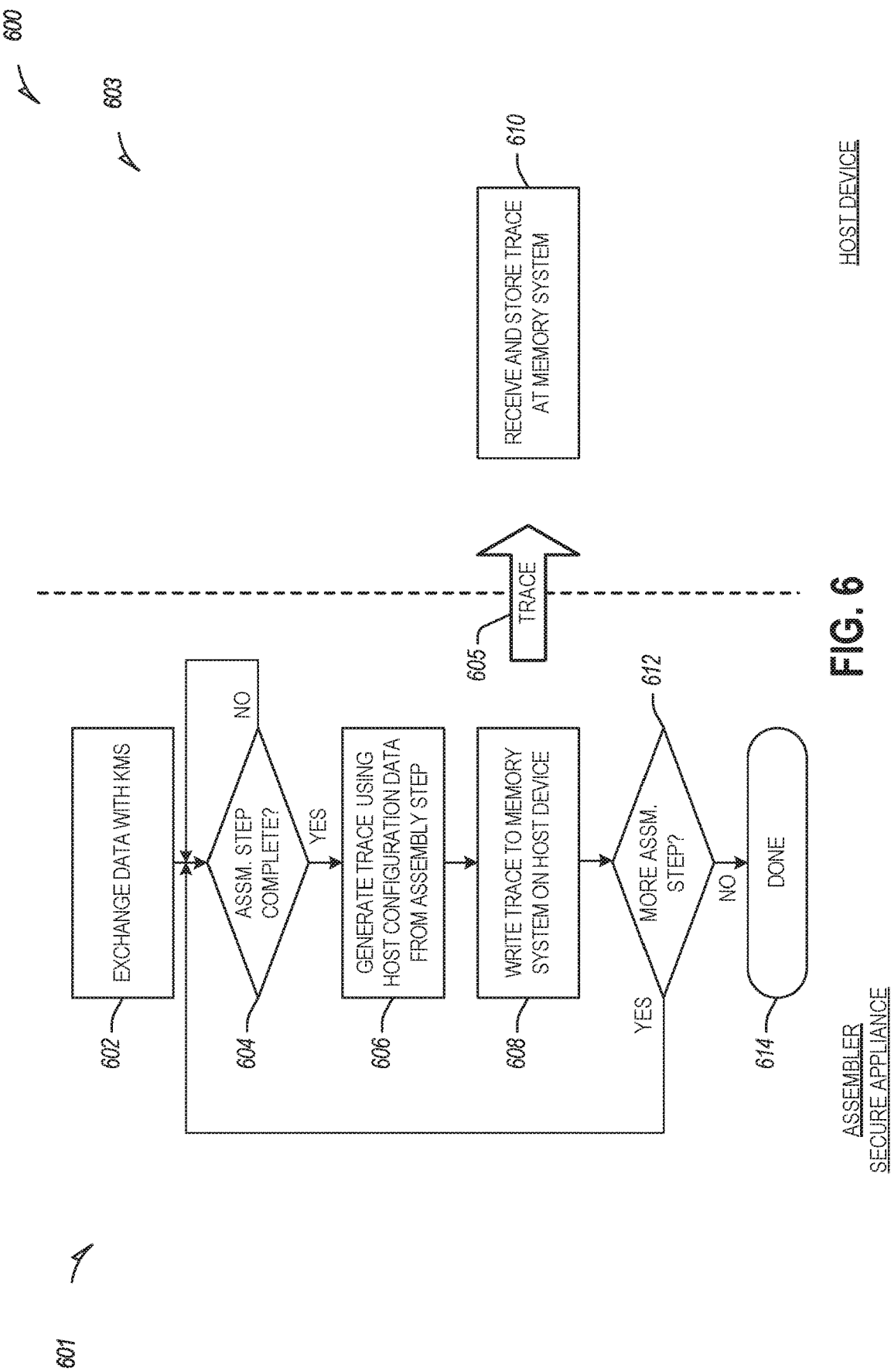
FIG. 6 is a flowchart showing one example of a process flow that may be executed by the assembler secure appliance to provide trace data to the host device.

FIG. 6 is a flowchart showing one example of a process flow 600 that may be executed by the assembler secure appliance 204A to provide trace data 605 to the host device 100. The flowchart of FIG. 6 includes two columns 601, 603. The column 601 includes actions performed by the assembler secure appliance 204A. The column 603 includes actions performed by the host device 100.

At operation 602, the assembler secure appliance 204A exchanges data with the key management server 202. The assembler secure appliance 204A receives secret data from the key management server 202 and provides trace-verification data to the key management server 202. In some examples, the assembler secure appliance 204A provides some or all of the trace-verification data to the key management sever 202 after the assembly step is complete at operation 604. For example, the trace-verification data can include host configuration data that is a result of the assembly step or not measurable until the assembly step is complete.

At operation 604, the assembler secure appliance 204A determines if the current assembly step for the host device 100 is complete. For example, if the current assembly step includes providing subscriber or other software to the host device 100, operation 604 includes determining whether the software provision is complete. If the current assembly step involves performing a test on the host device 100, operation 604 includes determining whether the test is complete. If the assembly step is not complete, the assembler secure appliance 204A continues to wait until the assembly step is complete.

If the assembly step is complete, the assembler secure appliance 204A generates trace data 605 at operation 606. At operation 608, the assembler secure appliance 204A provides the trace data 605 to the host device 100. The host device 100 receives and stores the trace data at the memory system 110 at operation 610. At operation 612, the assembler secure appliance 204A determines if there are any additional assembly steps to complete the host device 100. If there are no more assembly steps, the process flow 600 concludes at operation 614. If there are additional assembly steps, the assembler secure appliance 204A returns to operation 604 to wait for the next assembly step to be completed.

Various details of the process flow 600 may vary depending on the type of trace data 605 that is generated. Consider an example in which the trace data 605 includes a hash of the host configuration data (also referred to herein as the host configuration data hash). The host configuration data hash may be stored at a measured portion of the memory system 110. In this example, at operation 602, the assembler secure appliance 204A receives from the key management server 202 the memory system ID key and the root key for the memory system 110. The assembler secure appliance 204A uses the memory system ID key to generate a host configuration data hash at operation 606. The assembler secure appliance 204A uses the root key to send a signed command to the host device 100 and memory system 110 instructing that the host configuration data hash be stored at a measured portion of the memory system 110.

The assembler secure appliance 204A provides the key management server 202 with trace-verification data that may include, for example, the host configuration data hash and, for example, trace configuration data describing the trace data 605 such as, for example, that the trace data 605 is to be stored at a measured portion of the memory system 110 and includes the host configuration data hash.

Consider another example in which the assembler secure appliance 204A provides a cryptographic signature of the host configuration data hash with the trace data 605. In this example, at operation 602, the assembler secure appliance 204A may receive the memory system ID key for use in generating the host configuration data hash. Optionally, however, the secret data received from the key management server 202 may not include the root key, for example, if the trace data 605 is to be stored at a non-measured portion of the memory system 110.

At operation 606, the assembler secure appliance 204A generates the trace data 605, for example, by generating a cryptographic signature of the host configuration data hash using a private key of the assembler secure appliance 204A. The assembler secure appliance 204A sends the trace data 605 to the host device 100 at operation 608, but may not used a signed command, for example, if the trace data 605 is to be stored at a non-measured portion of the memory system 110.

The assembler secure appliance 204A provides the key management server 202 with trace-verification data that may include, for example, the host configuration data hash, and the public key of the assembler secure appliance 204A. The provided public key corresponds to the private key used to generate the cryptographic signature of the host configuration data hash. The assembler secure appliance 204A may also provide trace configuration data describing the form o the trace data 605.

Figure 7:
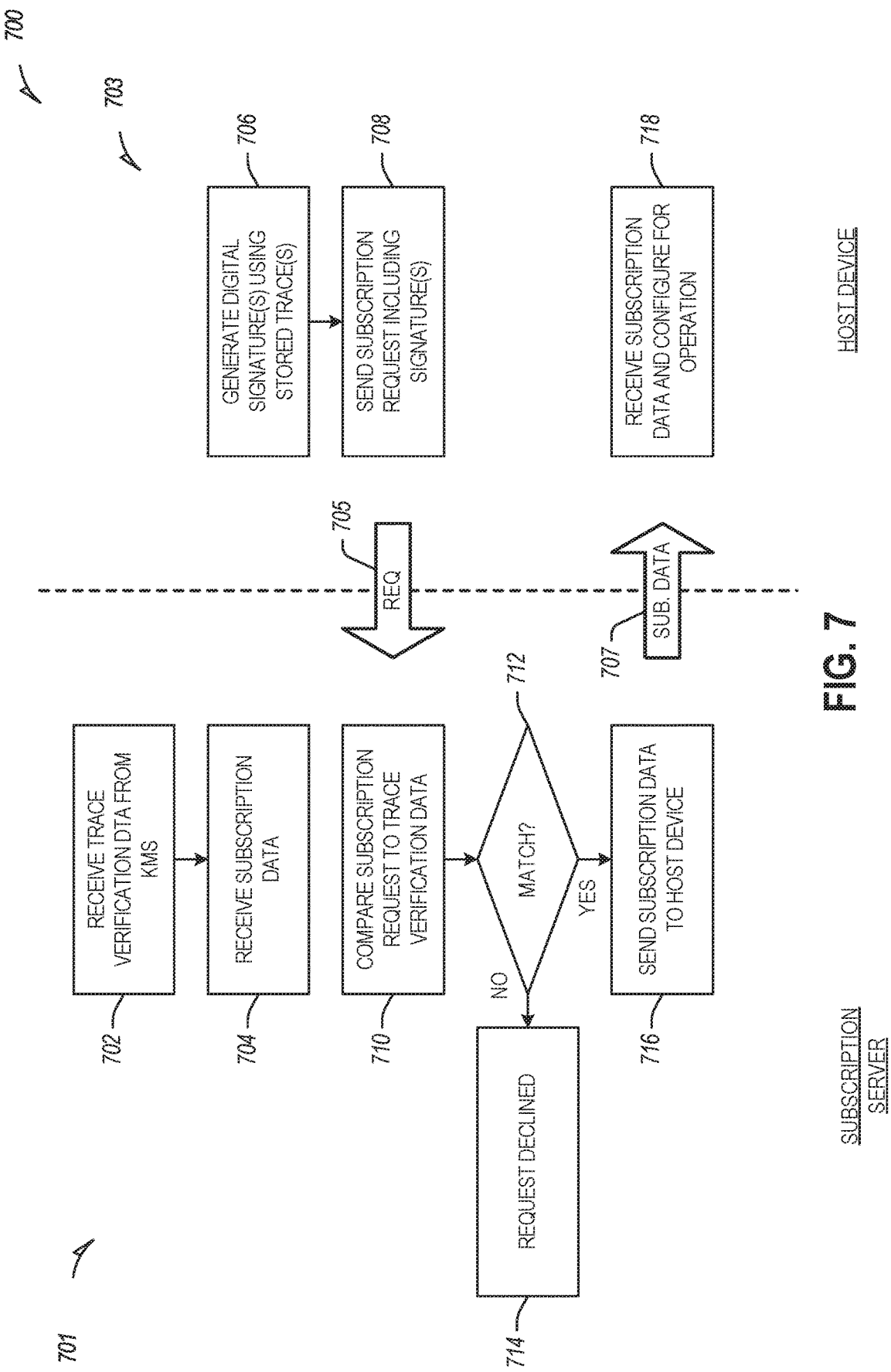
FIG. 7 is a flowchart showing one example of a process flow that may be executed by the subscription server and host device to subscribe the host device 100 to the subscription server.

FIG. 7 is a flowchart showing one example of a process flow 700 that may be executed by the subscription server 206 and host device 100 to subscribe the host device 100 to the subscription server 206. The flowchart of FIG. 7 includes two columns 701, 703. A first column 701 includes actions performed by the subscription server 206. A second column 703 includes actions performed by the host device 100 and/or the memory device 110 thereof.

At operation 702, the subscription server 206 receives trace verification data from the key management server 202. At operation 704, the subscription server 206 receives subscription data associated with the host device 100. The subscription data may indicate, for example, that a payment for the subscription service has been received on behalf of the host device 100.

At operation 706, the host device 100 generates trace-derived data using one or more instances of trace data stored at the host device 100 during assembly, for example, as described herein. For example, the host device 100 (and/or memory system 110) may utilize the memory system ID key to generate cryptographic signatures using the one or more instances of trace data. At operation 708, the host device 100 sends a subscription request 705 to the subscription server 206. The subscription request 705 includes the trace-derived data generated at operation 706.

At operation 710, the subscription server 206 compares the trace-derived data from the subscription request 705 to the trace verification data received from the key management server 202. At operation 712, if there is no match between the subscription request data and the trace verification data, the subscription server 206 declines the subscription request 705 at operation 714. The subscription server 206 may send a message to the host device 100 indicating that the subscription request 705 is cancelled or, in some examples, may take no further action. If there is a match between the subscription request data and the trace verification data, the subscription server 206 sends subscription data 707 to the host device 100 at operation 716. The host device 100 receives the subscription data 707 at operation 718 and uses the subscription data to configure the host device 100 for operation with the subscription service.

Consider once again an example in which the trace data stored at the host device 100 includes a host configuration data hash stored at a measured portion of the memory system 110. In this example, the trace verification data received by the subscription server 206 from the key management server 202 at operation 702 may include, for example, a copy of the host configuration data hash or hashes generated during assembly of the host device 100 and a copy of a memory system ID key for the memory system 110. The trace-derived data generated by the host device at operation 706 may include, for example, a cryptographic signature performed, for example, using the memory system ID key. The subscription server 206 may compare the trace-derived data to the trace verification data by using the memory system ID key received from the key management server 202 to generate a cryptographic signature of the host configuration data has received from the key management server 202. If the results match the cryptographic signature received with the subscription request 705, then the trace-derived data matches the trace verification data.

Consider again also an example in which the trace data stored at the host device 100 includes a cryptographic signature of the host configuration data hash generated by the assembler secure appliance 204A using a private key of the assembler secure appliance 204A. In this example, the trace-verification data provided to the subscription server 206 by the key management server 202 at operation 702 may include the public key of the assembler secure appliance 204A along with the host configuration data hash. The host device 100 may generate the trace-verification data at operation 706 by providing the stored cryptographic signature of the assembler secure appliance 204A. The subscription server 206 may compare the trace-derived data to the trace-verification data by verifying the cryptographic signature of the assembler secure appliance 204A using the public key of the assembler secure appliance 204A received from the key management server 202.

Figure 8:
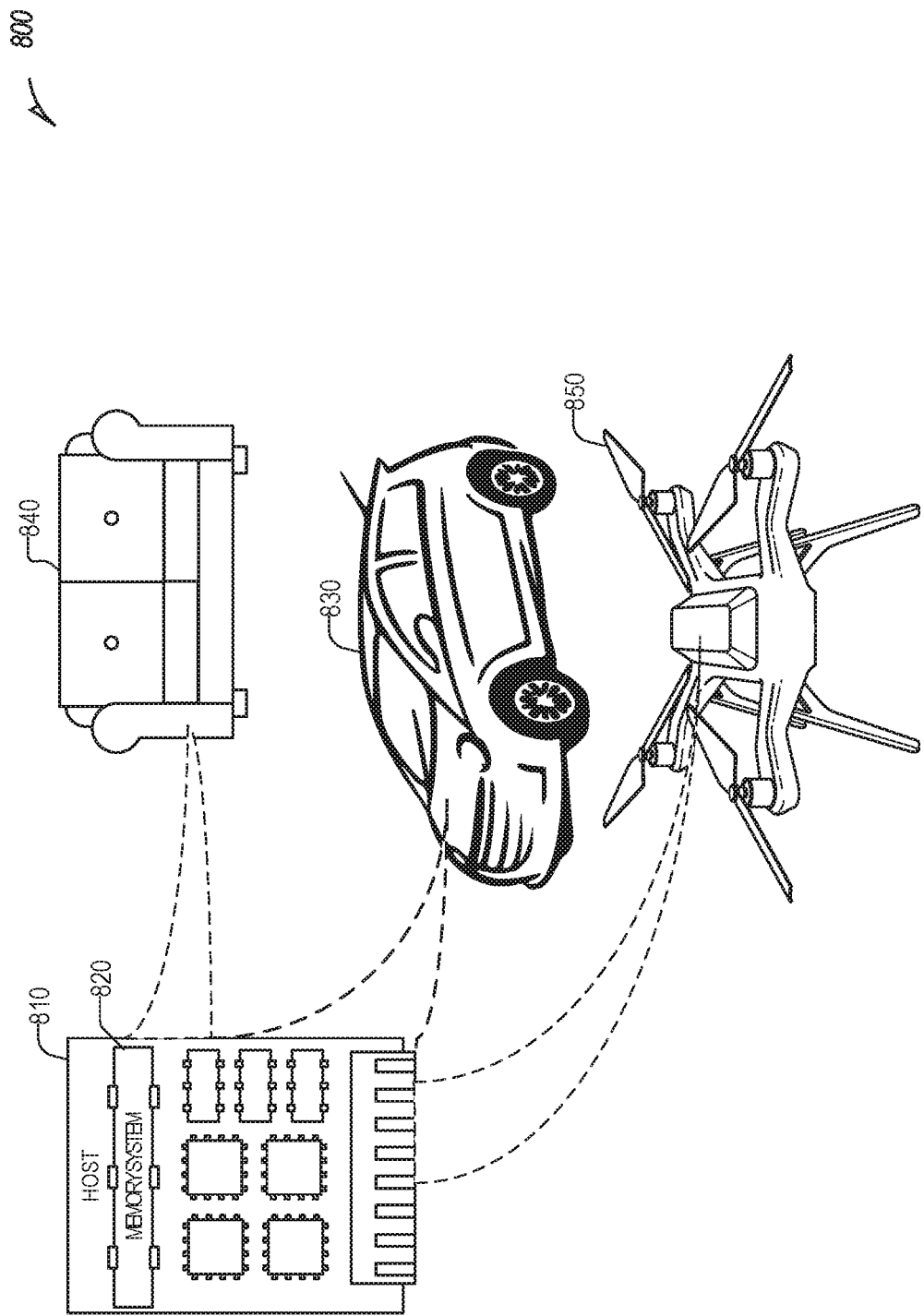
FIG. 8 shows an example environment including a host device with a memory system as part of one or more apparatuses.

FIG. 8 shows an environment 800 including an example host device 810 (e.g., host device 100) with a memory system 820 (e.g., memory system 110) as part of one or more apparatuses 830-9950. Apparatuses include any device that may include a host device, such as host device 810. The host device 810 may be any device capable of executing instructions (sequential or otherwise). Example apparatuses include a vehicle 830 (e.g., as part of an infotainment system, a control system, or the like), a drone 850 (e.g., as part of a control system), furniture or appliances 840 (e.g., as part of a sensor system, an entertainment or infotainment system), or the like. In other examples, although not shown, apparatuses may include aeronautical, marine, Internet of Things (IOT), and other devices.

Figure 9:
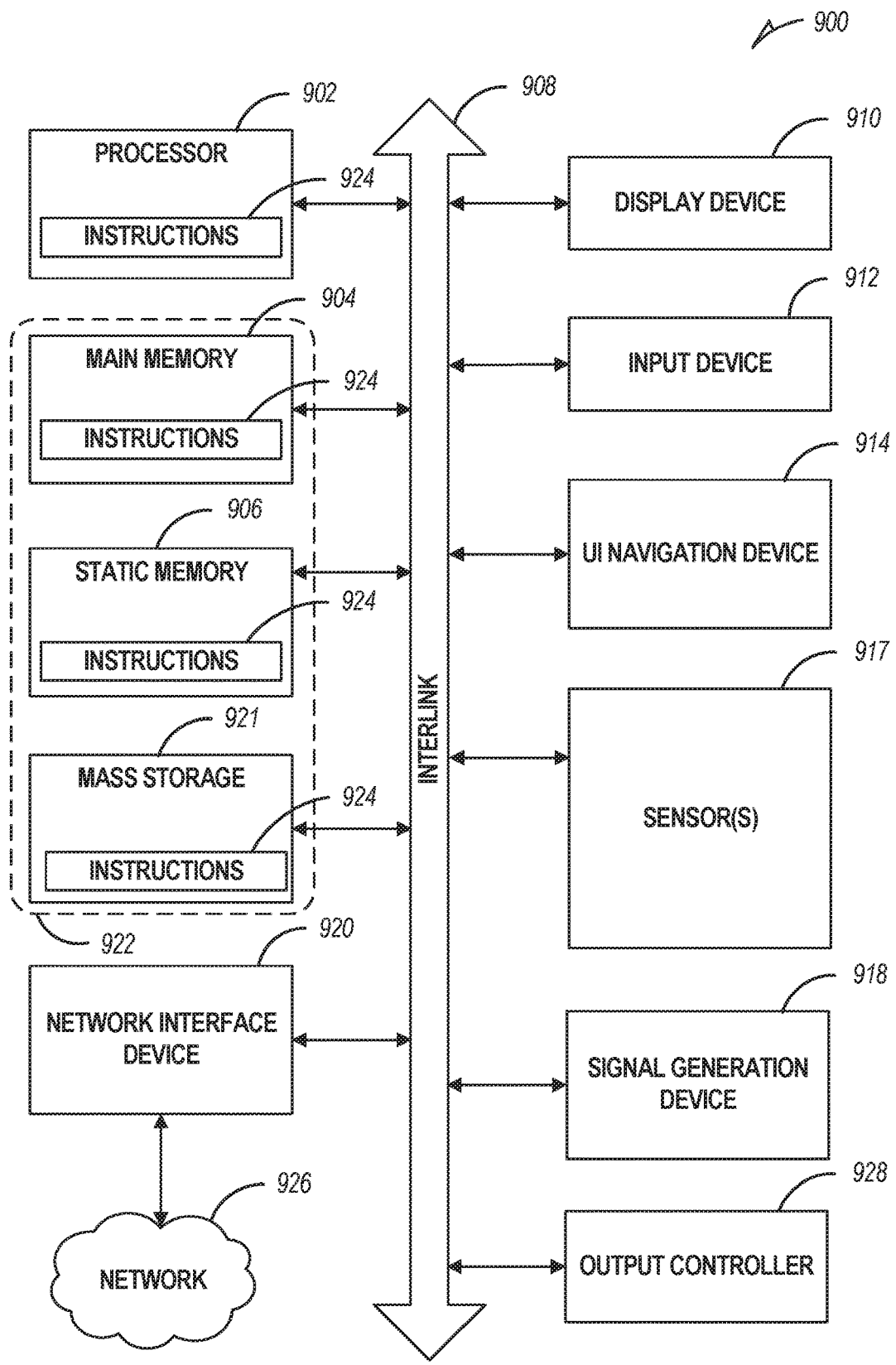
FIG. 9 is a block diagram illustrating an example of a machine upon which one or more embodiments may be implemented.

FIG. 9 illustrates a block diagram of an example machine 900 upon which any one or more of the techniques (e.g., methodologies) discussed herein may perform. In alternative embodiments, the machine 900 may operate as a standalone device or may be connected (e.g., networked) to other machines. In a networked deployment, the machine 900 may operate in the capacity of a server machine, a client machine, or both in server-client network environments. In an example, the machine 900 may act as a peer machine in peer-to-peer (P2P) (or other distributed) network environment. The machine 900 may be a personal computer (PC), a tablet PC, a set-top box (STB), a personal digital assistant (PDA), a mobile telephone, a web appliance, an IoT device, automotive system, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Examples, as described herein, may include, or may operate by, logic, components, devices, packages, or mechanisms. Circuitry is a collection (e.g., set) of circuits implemented in tangible entities that include hardware (e.g., simple circuits, gates, logic, etc.). Circuitry membership may be flexible over time and underlying hardware variability. Circuitries include members that may, alone or in combination, perform specific tasks when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a non-transitory computer readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable participating hardware (e.g., the execution units or a loading mechanism) to create members of the circuitry in hardware via the variable connections to carry out portions of the specific tasks when in operation. Accordingly, the computer readable medium is communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time.

The machine (e.g., computer system) 900 (e.g., host device 100, the memory system 110, secure appliances 207, 204A, 204N, subscription server 206, key management server 202, etc.) may include a hardware processor 902 (e.g., a central processing unit (CPU), a graphics processing unit (GPU), a hardware processor core, or any combination thereof, such as the memory controller 115, etc.), a main memory 904 and a static memory 906, some or all of which may communicate with each other via an interlink (e.g., bus) 908. The machine 900 may further include a display unit 910, an alphanumeric input device 912 (e.g., a keyboard), and a user interface (UI) navigation device 914 (e.g., a mouse). In an example, the display unit 910, input device 912 and UI navigation device 914 may be a touch screen display. The machine 900 may additionally include a storage device (e.g., drive unit) 922, a signal generation device 918 (e.g., a speaker), a network interface device 920, and one or more sensors 917, such as a global positioning system (GPS) sensor, compass, accelerometer, or other sensor. The machine 900 may include an output controller 928, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

The storage device 922 may include one or more machine readable media on which is stored one or more sets of data structures or instructions 924 (e.g., software) embodying or utilized by any one or more of the techniques or functions described herein. The instructions 924 may also reside, completely or at least partially, within the main memory 904, within static memory 906, or within the hardware processor 902 during execution thereof by the machine 900. In an example, one or any combination of the hardware processor 902, the main memory 904, the static memory 906, or the storage device 922 may constitute the machine readable medium.

While the machine readable medium 922 is illustrated as a single medium, the term "machine readable medium" may include a single medium or multiple media (e.g., a centralized or distributed database, or associated caches and servers) configured to store the one or more instructions 924.

The term "machine readable medium" may include any medium that is capable of storing, encoding, or carrying instructions for execution by the machine 900 and that cause the machine 900 to perform any one or more of the techniques of the present disclosure, or that is capable of storing, encoding or carrying data structures used by or associated with such instructions. Non-limiting machine readable medium examples may include solid-state memories, and optical and magnetic media. In an example, a massed machine readable medium comprises a machine-readable medium with a plurality of particles having invariant (e.g., rest) mass. Accordingly, massed machine-readable media are not transitory propagating signals. Specific examples of massed machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 924 (e.g., software, programs, an operating system (OS), etc.) or other data are stored on the storage device 921, can be accessed by the memory 904 for use by the processor 902. The memory 904 (e.g., DRAM) is typically fast, but volatile, and thus a different type of storage than the storage device 921 (e.g., an SSD), which is suitable for long-term storage, including while in an "off" condition. The instructions 924 or data in use by a user or the machine 900 are typically loaded in the memory 904 for use by the processor 902. When the memory 904 is full, virtual space from the storage device 921 can be allocated to supplement the memory 904; however, because the storage 921 device is typically slower than the memory 904, and write speeds are typically at least twice as slow as read speeds, use of virtual memory can greatly reduce user experience due to storage device latency (in contrast to the memory 904, e.g., DRAM). Further, use of the storage device 921 for virtual memory can greatly reduce the usable lifespan of the storage device 921.

In contrast to virtual memory, virtual memory compression (e.g., the Linux® kernel feature "ZRAM") uses part of the memory as compressed block storage to avoid paging to the storage device 921. Paging takes place in the compressed block until it is necessary to write such data to the storage device 921. Virtual memory compression increases the usable size of memory 904, while reducing wear on the storage device 921.

Storage devices optimized for mobile electronic devices, or mobile storage, traditionally include MMC solid-state storage devices (e.g., micro Secure Digital (microSD™) cards, etc.). MMC devices include a number of parallel interfaces (e.g., an 8-bit parallel interface) with a host device and are often removable and separate components from the host device. In contrast, eMMC™ devices are attached to a circuit board and considered a component of the host device, with read speeds that rival serial ATA™ (Serial AT (Advanced Technology) Attachment, or SATA) based SSD devices. However, demand for mobile device performance continues to increase, such as to fully enable virtual or augmented-reality devices, utilize increasing networks speeds, etc. In response to this demand, storage devices have shifted from parallel to serial communication interfaces. Universal Flash Storage (UFS) devices, including controllers and firmware, communicate with a host device using a low-voltage differential signaling (LVDS) serial interface with dedicated read/write paths, further advancing greater read/write speeds.

The instructions 924 may further be transmitted or received over a communications network 926 using a transmission medium via the network interface device 920 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 920 may include one or more physical jacks (e.g., Ethernet, coaxial, or phone jacks) or one or more antennas to connect to the communications network 926. In an example, the network interface device 920 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 900, and includes digital or analog communications signals or other intangible medium to facilitate communication of such software.

The above detailed description includes references to the accompanying drawings, which form a part of the detailed description. The drawings show, by way of illustration, specific embodiments in which the invention can be practiced. These embodiments are also referred to herein as "examples". Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In this document, the terms "a" or "an" are used, as is common in patent documents, to include one or more than one, independent of any other instances or usages of "at least one" or "one or more." In this document, the term "or" is used to refer to a nonexclusive or, such that "A or B" may include "A but not B," "B but not A," and "A and B," unless otherwise indicated. In the appended claims, the terms "including" and "in which" are used as the plain-English equivalents of the respective terms "comprising" and "wherein". Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

In various examples, the components, controllers, processors, units, engines, or tables described herein can include, among other things, physical circuitry or firmware stored on a physical device. As used herein, "processor" means any type of computational circuit such as, but not limited to, a microprocessor, a microcontroller, a graphics processor, a digital signal processor (DSP), or any other type of processor or processing circuit, including a group of processors or multi-core devices.

The term "horizontal" as used in this document is defined as a plane parallel to the conventional plane or surface of a substrate, such as that underlying a wafer or die, regardless of the actual orientation of the substrate at any point in time. The term "vertical" refers to a direction perpendicular to the horizontal as defined above. Prepositions, such as "on," "over," and "under" are defined with respect to the conventional plane or surface being on the top or exposed surface of the substrate, regardless of the orientation of the substrate; and while "on" is intended to suggest a direct contact of one structure relative to another structure which it lies "on" (in the absence of an express indication to the contrary); the terms "over" and "under" are expressly intended to identify a relative placement of structures (or layers, features, etc.), which expressly includes—but is not limited to—direct contact between the identified structures unless specifically identified as such. Similarly, the terms "over" and "under" are not limited to horizontal orientations, as a structure may be "over" a referenced structure if it is, at some point in time, an outermost portion of the construction under discussion, even if such structure extends vertically relative to the referenced structure, rather than in a horizontal orientation.

The terms "wafer" and "substrate" are used herein to refer generally to any structure on which integrated circuits are formed, and also to such structures during various stages of integrated circuit fabrication. The following detailed description is, therefore, not to be taken in a limiting sense, and the scope of the various embodiments is defined only by the appended claims, along with the full scope of equivalents to which such claims are entitled.

Various embodiments according to the present disclosure and described herein include memory utilizing a vertical structure of memory cells (e.g., NAND strings of memory cells). As used herein, directional adjectives will be taken relative a surface of a substrate upon which the memory cells are formed (i.e., a vertical structure will be taken as extending away from the substrate surface, a bottom end of the vertical structure will be taken as the end nearest the substrate surface and a top end of the vertical structure will be taken as the end farthest from the substrate surface).

As used herein, directional adjectives, such as horizontal, vertical, normal, parallel, perpendicular, etc., can refer to relative orientations, and are not intended to require strict adherence to specific geometric properties, unless otherwise noted. For example, as used herein, a vertical structure need not be strictly perpendicular to a surface of a substrate but may instead be generally perpendicular to the surface of the substrate and may form an acute angle with the surface of the substrate (e.g., between 60 and 120 degrees, etc.).

In some embodiments described herein, different doping configurations may be applied to a source-side select gate (SGS), a control gate (CG), and a drain-side select gate (SGD), each of which, in this example, may be formed of or at least include polysilicon, with the result such that these tiers (e.g., polysilicon, etc.) may have different etch rates when exposed to an etching solution. For example, in a process of forming a monolithic pillar in a 3D semiconductor device, the SGS and the CG may form recesses, while the SGD may remain less recessed or even not recessed. These doping configurations may thus enable selective etching into the distinct tiers (e.g., SGS, CG, and SGD) in the 3D semiconductor device by using an etching solution (e.g., tetramethylammonium hydroxide (TMCH)).

Operating a memory cell, as used herein, includes reading from, writing to, or erasing the memory cell. The operation of placing a memory cell in an intended state is referred to herein as "programming," and can include both writing to or erasing from the memory cell (e.g., the memory cell may be programmed to an erased state).

According to one or more embodiments of the present disclosure, a memory controller (e.g., a processor, controller, firmware, etc.) located internal or external to a memory device, is capable of determining (e.g., selecting, setting, adjusting, computing, changing, clearing, communicating, adapting, deriving, defining, utilizing, modifying, applying, etc.) a quantity of wear cycles, or a wear state (e.g., recording wear cycles, counting operations of the memory device as they occur, tracking the operations of the memory device it initiates, evaluating the memory device characteristics corresponding to a wear state, etc.)

According to one or more embodiments of the present disclosure, a memory access device may be configured to provide wear cycle information to the memory device with each memory operation. The memory device control circuitry (e.g., control logic) may be programmed to compensate for memory device performance changes corresponding to the wear cycle information. The memory device may receive the wear cycle information and determine one or more operating parameters (e.g., a value, characteristic) in response to the wear cycle information.

It will be understood that when an element is referred to as being "on," "connected to" or "coupled with" another element, it can be directly on, connected, or coupled with the other element or intervening elements may be present. In contrast, when an element is referred to as being "directly on," "directly connected to" or "directly coupled with" another element, there are no intervening elements or layers present. If two elements are shown in the drawings with a line connecting them, the two elements can be either be coupled, or directly coupled, unless otherwise indicated.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, the code can be tangibly stored on one or more volatile or non-volatile tangible computer-readable media, such as during execution or at other times. Examples of these tangible computer-readable media can include, but are not limited to, hard disks, removable magnetic disks, removable optical disks (e.g., compact discs and digital video disks), magnetic cassettes, memory cards or sticks, random access memories (RAMs), read only memories (ROMs), solid state drives (SSDs), Universal Flash Storage (UFS) device, embedded MMC (eMMC) device, and the like.

Example 1 is a system for configuring a host device, the system comprising: the host device, the host device comprising a memory system, wherein the host device is programmed to: receive subscriber software for interfacing the host device to a subscription service; receive from a first assembler secure appliance, first trace data based at least in part on the subscriber software; generate trace-derived data using the first trace data and a memory system identification key; send a subscription request to a subscription server associated with the subscription service, the subscription request comprising the trace-derived data; and receive, from the subscription server, subscription data for accessing the subscription service.

In Example 2, the subject matter of Example 1 optionally includes wherein the host device is further programmed to receive second trace data based at least in part on test result data describing results of a test performed on the host device, wherein the generating of the trace-derived data also uses the second trace data.

In Example 3, the subject matter of any one or more of Examples 1-2 optionally includes wherein the first trace data is received with a signed command from the first assembler secure appliance to store the first trace data at a secure portion of the memory system, and wherein the memory system is further programmed to: verify the signed command using a root key of the memory system; and responsive to verifying the signed command, store the first trace data at the secure portion of the memory system.

In Example 4, the subject matter of any one or more of Examples 1-3 optionally includes the first assembler secure appliance, wherein the first assembler secure appliance is programmed to send the first trace data to the host device.

In Example 5, the subject matter of Example 4 optionally includes wherein the first assembler secure appliance is further programmed to: send trace verification data to a key management server, the trace verification data comprising a public key of the first assembler secure appliance; and send a hash of the subscriber software to the key management server.

In Example 6, the subject matter of Example 5 optionally includes wherein the first assembler secure appliance is also programmed to: generate the first trace data using a private key of the first assembler secure appliance, the private key of the first assembler secure appliance associated with the public key of the first assembler secure appliance.

In Example 7, the subject matter of any one or more of Examples 4-6 optionally includes: wherein the first assembler secure appliance is further programmed to: receive a root key for the memory device from a key management server; and generate a signed command to the memory system instructing the memory system to store the first trace data at a secure portion of the memory system, the generating of the signed command using the root key; and wherein the memory system is configured to: verify the signed command; and responsive to verifying the signed command, store the first trace data at the secure portion of the memory system.

In Example 8, the subject matter of any one or more of Examples 1-7 optionally includes a key management server, wherein the key management server is programmed to: generate trace verification data using the first trace data and the memory system identification key; and send the trace verification data to the subscription server for verifying the subscription request.

In Example 9, the subject matter of any one or more of Examples 1-8 optionally includes wherein generating the trace-derived data comprises: reading the subscriber software from a secure portion of the memory system; and generating a subscriber software hash using the subscriber software and the memory system identification key.

Example 10 is a method for configuring a host device comprising a memory system, the method comprising: storing a memory system identification key at the memory system; receiving subscriber software, by the host device, the subscriber software for interfacing the host device to a subscription service; receiving, by the host device and from a first assembler secure appliance, first trace data based at least in part on the subscriber software; generating, by the host device, trace-derived data using the first trace data and the memory system identification key; sending, by the host device, a subscription request to a subscription server associated with the subscription service, the subscription request comprising the trace-derived data; and receiving, from the subscription server, subscription data for accessing the subscription service.

In Example 11, the subject matter of Example 10 optionally includes receiving, by the host device, second trace data based at least in part on test result data describing results of a test performed on the host device, wherein the generating of the trace-derived data also uses the second trace data.

In Example 12, the subject matter of any one or more of Examples 10-11 optionally includes wherein the first trace data comprises a cryptographic signature generated using a key of the first assembler secure appliance.

In Example 13, the subject matter of any one or more of Examples 10-12 optionally includes wherein the first trace data is received with a signed command from the first assembler secure appliance to store the first trace data at a secure portion of the memory system, further comprising: verifying the signed command using a root key of the memory system; and responsive to verifying the signed command, storing the first trace data at the secure portion of the memory system.

In Example 14, the subject matter of any one or more of Examples 10-13 optionally includes wherein generating the trace-derived data comprises: reading the subscriber software from a secure portion of the memory system; and generating a subscriber software hash value using the subscriber software and the memory system identification key.

Example 15 is a non-transitory machine-readable medium comprising operations stored thereon that, when executed by at least one processor, causes the at least one processor to perform operations comprising: receiving subscriber software, by a host device, the subscriber software for interfacing the host device to a subscription service; receiving, by the host device and from a first assembler secure appliance, first trace data based at least in part on the subscriber software; generating, by the host device, trace-derived data using the first trace data and a memory system identification key; sending, by the host device, a subscription request to a subscription server associated with the subscription service, the subscription request comprising the trace-derived data; and receiving, from the subscription server, subscription data for accessing the subscription service.

In Example 16, the subject matter of Example 15 optionally includes the operations further comprising receiving, by the host device, second trace data based at least in part on test result data describing results of a test performed on the host device, wherein the generating of the trace-derived data also uses the second trace data.

In Example 17, the subject matter of any one or more of Examples 15-16 optionally includes wherein the first trace data comprises a cryptographic signature generated using a key of the first assembler secure appliance.

In Example 18, the subject matter of any one or more of Examples 15-17 optionally includes wherein the first trace data is received with a signed command from the first assembler secure appliance to store the first trace data at a secure portion of the memory system, the operations further comprising: verifying the signed command using a root key of the memory system; and responsive to verifying the signed command, storing the first trace data at the secure portion of the memory system.

In Example 19, the subject matter of any one or more of Examples 15-18 optionally includes the operations further comprising: sending, by the first assembler secure appliance, trace verification data to a key management server, the trace verification data comprising a public key of the first assembler secure appliance; and send, by the first assembler secure appliance, a hash of the subscriber software to the key management server.

In Example 20, the subject matter of Example 19 optionally includes the operations further comprising generating, by the first assembler secure appliance the first trace data using a private key of the first assembler secure appliance, the private key of the first assembler secure appliance associated with the public key of the first assembler secure appliance.

The above description is intended to be illustrative, and not restrictive. For example, the above-described examples (or one or more aspects thereof) may be used in combination with each other. Other embodiments can be used, such as by one of ordinary skill in the art upon reviewing the above description. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A system for configuring a host device, the system comprising:
   the host device, the host device comprising a memory system, wherein the host device is programmed to:
   receive subscriber software for interfacing the host device to a subscription service, the subscriber software being installed to the memory system;
   receive from a first assembler secure appliance, first trace data and a signed command from the first assembler secure appliance to store the first trace data at a secure portion of the memory system, the first trace data comprising a hash of the subscriber software;
   verify the signed command using a root key of the memory system;
   responsive to verifying the signed command, store the first trace data at the secure portion of the memory system;
   generate trace-derived data using the first trace data and a memory system identification key;
   send a subscription request to a subscription server associated with the subscription service, the subscription request comprising the trace-derived data, the subscription server being distinct from the first assembler secure appliance;
   receive, from the subscription server, subscription data for accessing the subscription service; and
   access the subscription service using the subscriber software and the subscription data.

2. The system of claim 1, wherein the host device is further programmed to receive second trace data based at least in part on test result data describing results of a test performed on the host device, wherein the generating of the trace-derived data also uses the second trace data.

3. The system of claim 1, further comprising the first assembler secure appliance, wherein the first assembler secure appliance is programmed to send the first trace data to the host device.

4. The system of claim 3, wherein the first assembler secure appliance is further programmed to:
   send trace verification data to a key management server, the trace verification data comprising a public key of the first assembler secure appliance; and
   send the hash of the subscriber software to the key management server.

5. The system of claim 4, wherein the first assembler secure appliance is also programmed to:
   generate the first trace data using a private key of the first assembler secure appliance, the private key of the first assembler secure appliance associated with the public key of the first assembler secure appliance to apply a cryptographic hash function.

6. The system of claim 3, wherein the first assembler secure appliance is further programmed to:
   receive a root key for the memory system from a key management server; and
   generate the signed command using the root key.

7. The system of claim 1, further comprising a key management server, wherein the key management server is programmed to:
   generate trace verification data using the first trace data and the memory system identification key; and
   send the trace verification data to the subscription server for verifying the subscription request.

8. The system of claim 1, wherein generating the trace-derived data comprises:
   reading the subscriber software from a secure portion of the memory system; and
   generating a second hash of the subscriber software using the subscriber software and the memory system identification key.

9. A method for configuring a host device comprising a memory system, the method comprising:
   storing a memory system identification key at the memory system;
   receiving subscriber software, by the host device, the subscriber software for interfacing the host device to a subscription service the subscriber software being installed to the memory system;
   receiving, by the host device and from a first assembler secure appliance, first trace data and a signed command from the first assembler secure appliance to store the first trace data at a secure portion of the memory system, the first trace data comprising a hash of the subscriber software;
   verifying the signed command using a root key of the memory system;
   responsive to verifying the signed command, storing the first trace data at the secure portion of the memory system;
   generating, by the host device, trace-derived data using the first trace data and the memory system identification key;
   sending, by the host device, a subscription request to a subscription server associated with the subscription service, the subscription request comprising the trace-derived data, the subscription server being distinct from the first assembler secure appliance;

receiving, from the subscription server, subscription data for accessing the subscription service; and accessing the subscription service using the subscriber software and the subscription data.

10. The method of claim 9, further comprising receiving, by the host device, second trace data based at least in part on test result data describing results of a test performed on the host device, wherein the generating of the trace-derived data also uses the second trace data.

11. The method of claim 9, wherein the first trace data comprises a cryptographic signature generated using a key of the first assembler secure appliance.

12. The method of claim 9, wherein generating the trace-derived data comprises:

reading the subscriber software from a secure portion of the memory system; and generating a second hash of the subscriber software using the subscriber software and the memory system identification key.

13. A non-transitory machine-readable medium comprising operations stored thereon that, when executed by at least one processor, causes the at least one processor to perform operations comprising:

receiving subscriber software, by a host device comprising a memory system, the subscriber software for interfacing the host device to a subscription service the subscriber software being installed to the memory system;

receiving, by the host device and from a first assembler secure appliance, first trace data and a signed command from the first assembler secure appliance to store the first trace data at a secure portion of the memory system, the first trace data comprising a hash of the subscriber software;

verifying, by the host device, the signed command using a root key of the memory system;

responsive to verifying the signed command, storing, by the host device, the first trace data at the secure portion of the memory system;

generating, by the host device, trace-derived data using the first trace data and a memory system identification key associated with a memory system of the host device;

sending, by the host device, a subscription request to a subscription server associated with the subscription service, the subscription request comprising the trace-derived data, the subscription server being distinct from the first assembler secure appliance;

receiving, from the subscription server, subscription data for accessing the subscription service; and accessing the subscription service using the subscriber software and the subscription data.

14. The medium of claim 13, the operations further comprising receiving, by the host device, second trace data based at least in part on test result data describing results of a test performed on the host device, wherein the generating of the trace-derived data also uses the second trace data.

15. The medium of claim 13, wherein the first trace data comprises a cryptographic signature generated using a key of the first assembler secure appliance.

16. The medium of claim 13, the operations further comprising:

sending, by the first assembler secure appliance, trace verification data to a key management server, the trace verification data comprising a public key of the first assembler secure appliance; and send, by the first assembler secure appliance, the hash of the subscriber software to the key management server.

17. The medium of claim 16, the operations further comprising generating, by the first assembler secure appliance the first trace data using a private key of the first assembler secure appliance, the private key of the first assembler secure appliance associated with the public key of the first assembler secure appliance.

* * * * *